United States Patent
Zou et al.

(10) Patent No.: US 6,627,565 B1
(45) Date of Patent: Sep. 30, 2003

(54) CRYSTALLIZED GLASS SUBSTRATE FOR INFORMATION RECORDING MEDIUM

(75) Inventors: Xuelu Zou, Akishima (JP); Katsuaki Uchida, Tokyo (JP)

(73) Assignee: Hoya Corporation, Tokyo (JP)

( * ) Notice: Subject to any disclaimer, the term of this patent is extended or adjusted under 35 U.S.C. 154(b) by 182 days.

(21) Appl. No.: 09/626,462

(22) Filed: Jul. 26, 2000

(30) Foreign Application Priority Data

Oct. 22, 1999 (JP) ............................................. 11-301720
Jul. 27, 1999 (JP) ............................................. 11-211833

(51) Int. Cl.$^7$ ............................................. C03C 10/14
(52) U.S. Cl. ............. 501/4; 501/5; 501/9; 428/694 ST
(58) Field of Search ............... 501/4, 5, 9; 428/694 ST, 428/694 SG

(56) References Cited

U.S. PATENT DOCUMENTS

| | | | | |
|---|---|---|---|---|
| 3,873,329 A | * | 3/1975 | Beall | 501/4 |
| 5,476,821 A | * | 12/1995 | Beall et al. | 501/40 |
| 5,532,194 A | * | 7/1996 | Kawashima et al. | 501/9 |
| 6,124,223 A | * | 9/2000 | Beall et al. | 501/4 |
| 6,294,490 B1 | * | 9/2001 | Zou et al. | 501/9 |
| 6,344,423 B2 | * | 2/2002 | Goto et al. | 501/4 |

* cited by examiner

*Primary Examiner*—Karl Group
(74) *Attorney, Agent, or Firm*—Burns, Doane, Swecker & Mathis, L.L.P.

(57) ABSTRACT

Crystallized glasses for data recording media such as magnetic disks are provided, comprising 42–65 mol % $SiO_2$, 11–25 mol % $Al_2O_3$, 15–33 mol % MgO and 5.5–13 mol % $TiO_2$ or 58–80 mol % $SiO_2+Al_2O_3$ with $MgO/(SiO_2+Al_2O_3)$ being in the range of 0.125–0.55, wherein major crystals or crystals present at 50% by volume or more comprise α-quartz solid solution or quartz-based crystals and enstatite and/or enstatite solid solution, or quartz-based crystals having a diffraction pattern almost comparable to that unique to quartz in the X-ray diffraction pattern and enstatite and/or enstatite solid solution and wherein the specific gravity is 2.9 g/cm$^3$ or more. Said glass substrates have high Young's modulus, strength and heat resistance and excellent surface smoothness and surface homogeneity, and can be easily prepared.

33 Claims, 1 Drawing Sheet

CRYSTALLIZED GLASS SUBSTRATE FOR INFORMATION RECORDING MEDIUM

BACKGROUND OF THE INVENTION

1. Field of the Invention

The present invention relates to crystallized glass substrates for data recording media. Particularly, the present invention relates to substrates made of a glass ceramic having high strength and high stiffness useful as various electric and electronic components such as magnetic disk substrates or ferrules.

More specifically, crystallized glasses of the present invention can be easily molded and contain crystal species precipitated by glass heat treatment, such as α-quartz solid solution or quartz-based crystals, enstatite, etc. The present invention also relates to high-Young's modulus crystallized glass substrates made of a glass composition that can be easily polished and has high Young's modulus and high surface smoothness as well as an expansion coefficient adaptable to that of other stainless components incorporated into HDDs, said composition being obtained by heat-treating an $MgO-Al_2O_3-SiO_2$ glass at an appropriate temperature using $TiO_2$ as a nucleating agent to crystallize it.

2. Description of the Related Art

Main components of magnetic storage apparatus such as computers are magnetic recording media and magnetic recording and reproducing heads. Known magnetic recording media include flexible disks and hard disks. Aluminum alloys have been mainly used as substrate materials for hard disks. Recently, the flying height of magnetic heads has been remarkably reduced as the magnetic recording density of hard disk drives for personal computers or servers becomes higher. Thus, there is a demand for extremely high precision in surface smoothness of magnetic disk substrates. However, it is difficult to produce a flat surface from aluminum alloys to satisfy a certain precision level, because aluminum alloys have too low hardness to avoid plastic deformation even if they are polished with high-precision abrasives and machining tools. As the recording density in hard disk drives becomes higher, a demand for reducing deflection or vibration of substrates for magnetic disks during high-speed rotation has also been increasing. However, it is difficult for aluminum alloys to keep some deflection or vibration level required by the specifications of hard disk drives spinning at high speed on the order of 10000 rpm because its Young's modulus is low. Thus, glass substrates for magnetic disks with high stiffness and high surface smoothness appeared. Among those, chemically strengthened glass substrates and crystallized substrates are well known in which the substrate surface has been strengthened by ion exchange and subjected to a crystallization treatment, respectively.

For example, a glass substrate strengthened by ion exchange is disclosed in JP-A No. 239036/89, which relates to a glass substrate for magnetic disks strengthened by forming a compression stress layer by alkali ion exchange on the surface of the glass substrate comprising, expressed in weight percent, 50–65% $SiO_2$, 0.5–14% $Al_2O_3$, 10–32% $R_2O$ wherein R represents an alkali metal ion, 1–15% ZnO and 1.1–14% $B_2O_3$.

For example, a crystallized glass is disclosed in U.S. Pat. No. 5,391,522, which relates to a crystallized glass for magnetic disks comprising, expressed in weight percent, 65–83% $SiO_2$, 8–13% $Li_2O$, 0–7% $K_2O$, 0.5–5.5% MgO, 0–5% ZnO, 0–5% PbO, provided that MgO+ZnO+PbO= 0.5–5%, 1–4% $P_2O_5$, 0–7% $Al_2O_3$, 0–2% $As_2O_3+Sb_2O_3$ and containing fine $Li_2O\cdot2SiO_2$ crystalline grains as major crystals.

U.S. Pat. No. 5,476,821 discloses a crystallized glass for disks comprising, expressed in weight percent, oxide components such as 35–60% $SiO_2$, 20–35% $Al_2O_3$, 0–25% MgO, 0–25% ZnO, provided that MgO+ZnO>10%, 0–20% $TiO_2$, 0–10% $ZrO_2$, 0–2% $Li_2O$, 0–8% NiO, provided that $TiO_2+ZrO_2+NiO>5\%$ and containing spinel crystalline grains as major crystals.

U.S. Pat. No. 5,491,116 also discloses a crystallized glass. This crystallized glass is a glass-ceramic article exhibiting a modulus of rupture of at least about 15,000psi, a Knoop hardness of greater than about 760 KHN, a Young's modulus of about $20\times10^6$ psi and a fracture toughness in excess of 1.0 $Mpa.m^{1/2}$, wherein major crystalline phases comprise enstatite or its solid solution and spinel crystals, the article having a composition at least 92% of which consists essentially, expressed in weight percent, of 35–60% $SiO_2$, 10–30% $Al_2O_3$, 12–30% MgO, 0–10% ZnO, 5–20% $TiO_2$ and 0–8% NiO. A substrate for magnetic disks comprising said crystallized glass is also disclosed.

However, the recent increase of magnetic recording density in hard disks accelerates the reduction of the flying height of magnetic heads and the increase of the rotation speed of disks, which imposes more strict requirements on Young's modulus or surface smoothness of substrate materials for disks. Particularly, the recent increase of data recording density in 3.5-inch hard disks for personal computers and servers strictly requires surface smoothness and flatness for substrate materials. In load/unload mode (ramp load mode), extremely flatter media with low bumps and less variation in bump height are required as compared with CCS (contact start/stop mode). Specifically, Rmax=3–10 nm or less and Ra=0.2–2.5 nm or less are needed. The requirements for the stiffness of substrate materials have also become stricter in order to provide disks with a rotation speed of 10000 rpm or more to increase data processing speed. There is also a demand for substrate materials having a high expansion coefficient of $90\times10^{-7}/°$ C. or more to suit to the thermal expansion of stainless components incorporated into hard disks. The capacity and rotation speed of hard disks are expected to be further higher in future, which should necessarily generate a great demand for substrate materials for magnetic data media having even higher Young's modulus, high expansion, excellent surface flatness, shock resistance or other properties.

Therefore, it is evident that chemically strengthened glasses as disclosed in JP-A No. 239036/89 having a Young's modulus of about 80 GPa will be insufficient for future strict requirements for hard disks. Glasses chemically strengthened by ion exchange were found to have the disadvantage that they contain a large amount of alkaline components, which are precipitated as alkali ions at pinholes in magnetic films or thin sites such as peripheries of magnetic films or the sites from which glass is exposed after long use in a high-temperature and high-humidity environment, resulting in corrosion or deterioration of the magnetic films. Since conventional glasses strengthened by ion exchange contain a large amount of alkali ions for ion exchange, most of them have too low Young's modulus (100 GPa) and too low stiffness to meet the requirements by 3.5-inch substrates with high recording density and high rotation speed. Some heat treatment is sometimes applied to improve properties such as coercive force of a magnetic layer after the magnetic layer has been provided on a glass substrate during the process for manufacturing a magnetic data medium, but conventional glasses strengthened by ion exchange as described above cannot achieve a high coercive force because they have low heat resistance as evident from their glass transition temperature of at most 500° C.

Conventional crystallized glasses as disclosed in U.S. Pat. No. 5,391,522 are a little superior to the chemically strengthened glasses in Young's modulus and heat resistance. However, they are difficult to combine with other components of hard disks and to incorporate into a precise mechanism design required for high density because of their thermal expansion coefficient of at most about $70 \times 10^{-7}/°$ C. Another problem is that they have low surface smoothness as shown by surface roughness>10 angstroms, which limits reduction of the flying height of magnetic heads to hinder high-density magnetic recording. Moreover, they cannot be applied to 3.5-inch high-end disk substrates or thin disk substrates because their Young's modulus is at most about 90–100 GPa.

The crystallized glass for magnetic disks disclosed in U.S. Pat. No. 5,476,821 has a high Young's modulus of about 140 GPa at maximum. However, it has the disadvantage that major crystals consist of spinel crystals so that the melting temperature or liquid phase temperature becomes high and a too wide difference in hardness between the spinel crystals and the matrix glass makes polishing difficult. Such a high-Young's modulus crystallized glass is not suitable for mass production because it is difficult to economically prepare with profit. Moreover, thermal expansion coefficient of said glass is at most about $70 \times 10^{-7}/°$ C., which is far lower than that of stainless to hinder precise mechanism design required for high density.

The crystallized glass disclosed in U.S. Pat. No. 5,491,116 is also difficult to polish because of the high content of spinel species and is unsuitable for precise mechanism design required for high density because of the thermal expansion coefficient of at most about $70 \times 10^{-7}/°$ C., which is far lower than that of stainless.

Thus, an object of the present invention is to provide a glass substrate capable of satisfying the requirements for substrates for future magnetic recording media such as small thickness, high stiffness, high heat resistance, high shock resistance, and more specifically to provide a crystallized glass for data recording media such as magnetic disks, which has high Young's modulus, strength and heat resistance and excellent surface smoothness and surface homogeneity and can be applied to load/unload mode and can be economically prepared.

Another object of the present invention is to provide a process for preparing said crystallized glass.

Still another object of the present invention is to provide a data recording medium such as a magnetic recording medium using a substrate made of said crystallized glass.

SUMMARY OF THE INVENTION

The present invention relates to a crystallized glass substrate for data recording media comprising 42–65 mol % $SiO_2$, 11–25 mol % $Al_2O_3$, 15–33 mol % MgO and 5.5–13 mol % $TiO_2$ and comprising α-quartz solid solution and enstatite and/or enstatite solid solution as major crystals (hereinafter referred to as crystallized glass substrate (1)).

The present invention also relates to a crystallized glass substrate for data recording media comprising 42–65 mol % $SiO_2$, 11–25 mol % $Al_2O_3$, 15–33 mol % MgO and 5.5–13 mol % $TiO_2$ and comprising α-quartz solid solution and enstatite and/or enstatite solid solution wherein the total of the α-quartz solid solution, enstatite and enstatite solid solution is 50% by volume or more in the crystals (hereinafter referred to as crystallized glass substrate (2)).

The present invention also relates to a crystallized glass substrate for data recording media comprising 42–65 mol % $SiO_2$, 11–25 mol % $Al_2O_3$, 15–33 mol % MgO and 5.5–13 mol % $TiO_2$ wherein major crystalline phases comprise quartz-based crystals having a diffraction pattern almost comparable to that unique to quartz in the X-ray diffraction pattern and enstatite and/or enstatite solid solution and the specific gravity is 2.9 g/cm³ or more (hereinafter referred to as crystallized glass substrate (3)).

The present invention also relates to a crystallized glass substrate for data recording media comprising 42–65 mol % $SiO_2$, 11–25 mol % $Al_2O_3$, 15–33 mol % MgO and 5.5–13 mol % $TiO_2$ wherein crystalline phases comprise quartz-based crystals having a diffraction pattern almost comparable to that unique to quartz in the X-ray diffraction pattern and enstatite and/or enstatite solid solution, the total of the quartz-based crystals, enstatite and enstatite solid solution is 50% by volume or more in the crystals and the specific gravity is 2.9 g/cm³ or more (hereinafter referred to as crystallized glass substrate (4))

In said crystallized glass substrates (1)–(4), $SiO_2+Al_2O_3$ may be in the range of 58–80 mol %, $MgO/(SiO_2+Al_2O_3)$ may be in the range of 0.125–0.55, 0–4 mol % $ZrO_2$ may be contained and 0.1–5 mol % $Y_2O_3$ may be contained.

The present invention also relates to a crystallized glass substrate for data recording media wherein $SiO_2+Al_2O_3$ is in the range of 58–80 mol %, the molar ratio $MgO/(SiO_2+Al_2O_3)$ is in the range of 0.125–0.55 and the molar ratio $SiO_2/Al_2O_3$ is in the range of 2.3–4.2, major crystalline phases comprise quartz-based crystals having a diffraction pattern almost comparable to that unique to quartz in the X-ray diffraction pattern and enstatite and/or enstatite solid solution and the specific gravity is 2.9 g/cm³ or more (hereinafter referred to as crystallized glass substrate (5)).

The present invention also relates to a crystallized glass substrate for data recording media wherein $SiO_2+Al_2O_3$ is in the range of 58–80 mol % and $MgO/(SiO_2+Al_2O_3)$ is in the range of 0.125–0.55, crystalline phases comprise quartz-based crystals having a diffraction pattern almost comparable to that unique to quartz in the X-ray diffraction pattern and enstatite and/or enstatite solid solution, the total of the quartz-based crystals, enstatite and enstatite solid solution is 50% by volume or more in the crystals and the specific gravity is 2.9 g/cm³ or more (hereinafter referred to as crystallized glass substrate (6)).

Said crystallized glass substrates (5) and (6) may contain 0–4 mol % $ZrO_2$ and 0.1–5 mol % $Y_2O_3$.

Said crystallized glass substrates (1)–(6) may have a Young's modulus of 110 GPa or more, a thermal expansion coefficient of $90 \times 10^{-7}/°$ C. or more at 30–300 ° C., and a grain size of the crystalline phases in the range of 10–1000 nm, and they may be free from ZnO.

The present invention also relates to a crystallized glass substrate for data recording media comprising 42–65 mol % $SiO_2$, 11–25 mol % $Al_2O_3$, 15–33 mol % MgO, 5.5–13 mol % $TiO_2$ and 0.1–5 mol % $Y_2O_3$ and comprising α-quartz solid solution and enstatite and/or enstatite solid solution as major crystals (hereinafter referred to as crystallized glass substrate (7)).

The present invention also relates to a crystallized glass substrate for data recording media comprising 42–65 mol % $SiO_2$, 11–25 mol % $Al_2O_3$, 15–33 mol % MgO, 5.5–13 mol % $TiO_2$, 0.1–5 mol % $Y_2O_3$ and 0–4 mol % $ZrO_2$ and comprising α-quartz solid solution and enstatite and/or enstatite solid solution as major crystals (hereinafter referred to as crystallized glass substrate (8))

In said crystallized glass substrates (7) and (8), $SiO_2+Al_2O_3$ maybe in the range of 58–80mol %, the molar ratio $MgO/(SiO_2+Al_2O_3)$ may be in the range of 0.125–0.55 and the molar ratio $SiO_2/Al_2O_3$ may be in the range of 2.3–4.2.

In said crystallized glass substrates (1)–(8), the data recording media may be magnetic disks.

The present invention also relates to a process for preparing a crystallized glass substrate for data recording media comprising subjecting a glass comprising 42–65 mol % $SiO_2$, 11–25 mol % $Al_2O_3$, 15–33 mol % MgO and 5.5–13 mol % $TiO_2$ with the molar ratio $MgO/(SiO_2+Al_2O_3)$ being in the range of 0.125–0.55 and the molar ratio $SiO_2/Al_2O_3$ being in the range of 2.3–4.2 to a nucleation heat treatment step and a crystallization treatment step to give a crystallized glass wherein the heat treatment temperature in said nucleation heat treatment step is in the range of 760–840° C., the heat treatment temperature in said crystallization treatment step is in the range of 950–1150° C. and the heat treatment temperatures in said nucleation heat treatment step and crystallization treatment step are selected in such a manner that the resulting crystallized glass has a thermal expansion coefficient of $90\times10^{-7}/°$ C. or more at 30–300° C. Said process can be used to prepare said crystallized glass substrates (1)–(8) according to the present invention.

In said process, the heat treatment temperature in said nucleation heat treatment step may be in the range of 810–830° C. and the heat treatment temperature in said crystallization treatment step may be in the range of 1010–1150° C.

The present invention also relates to a crystallized glass substrate for data recording media obtained by a process comprising subjecting a glass comprising 42–65 mol % $SiO_2$, 11–25 mol % $Al_2O_3$, 15–33 mol % MgO and 5.5–13 mol % $TiO_2$ with the molar ratio $MgO/(SiO_2+Al_2O_3)$ being in the range of 0.125–0.55 and the molar ratio $SiO_2/Al_2O_3$ being in the range of 2.3–4.2 to a nucleation heat treatment step and a crystallization treatment step to give a crystallized glass wherein the heat treatment temperature in said nucleation heat treatment step is in the range of 760–840° C., the heat treatment temperature in said crystallization treatment step is in the range of 950–1150° C. and the heat treatment temperatures in said nucleation heat treatment step and crystallization treatment step are selected in such a manner than the resulting crystallized glass has a thermal expansion coefficient of $90\times10^{-7}/°$ C. or more at 30–300° C. (hereinafter referred to as crystallized glass substrate (9))

In said crystallized glass substrate (9), the heat treatment temperature in said nucleation heat treatment step may be in the range of 810–830° C., the heat treatment temperature in said crystallization treatment step may be in the range of 1010–1150° C., the molar ratio $SiO_2/Al_2O_3$ of said glass may be 3.25 or more and the specific gravity of said crystallized glass may be 2.9 g/cm$^3$ or more.

In said crystallized glass substrate (9), the data recording media may be magnetic disks.

The present invention also relates to a data recording medium comprising a crystallized glass substrate (1)–(9) according to the present invention and a recording layer formed on said substrate. Said recording layer may be a magnetic recording layer.

For example, high-Young's modulus crystallized glasses of the present invention comprise enstatite (or its solid solution) crystals with high stiffness and α-quartz solid solution crystals or quartz-based crystals with high expansion as major crystals.

We carefully studied to provide a crystallized glass material having a Young's modulus of 110 GPa or more and a thermal expansion coefficient of $90\times10^{-7}/°$ C. or more at 30–300° C. As a result, we accomplished the present invention on the basis of the finding that microcrystalline grains such as α-quartz solid solution or quartz-based crystals or enstatite can be precipitated by heat-treating a crude MgO—$Al_2O_3$—$SiO_2$-based glass containing $TiO_2$ as an essential component at an appropriate temperature and that the resulting crystallized glass has a high Young' modulus of 110–180 GPa and a high thermal expansion coefficient of $90\times10^{-7}/°$ C. or more at 30–300° C. and can be easily molded, and that the resulting glass substrate can easily be polished.

α-Quartz solid solution has a relatively high thermal expansion coefficient (at 30–300° C.) (α-quartz solid solution: about $150\times10^{-7}/°$ C., β-quartz solid solution: about $-5\times10^{-7}/°$ C., enstatite: about $81\times10^{-7}/°$ C., spinel: about $88\times10^{-7}/°$ C.) Enstatite is thought to provide a high Young's modulus even if the grain size is small, because it has a chainlike or laminar crystal form into which glass components penetrate. It is thought that a crystallized glass having a high Young's modulus and a high thermal expansion coefficient (at 30–300° C.) can be obtained by precipitating such α-quartz solid solution with high expansion and enstatite and/or its solid solution as major crystalline phases.

DESCRIPTION OF THE PREFERRED EMBODIMENTS

Figure 1:
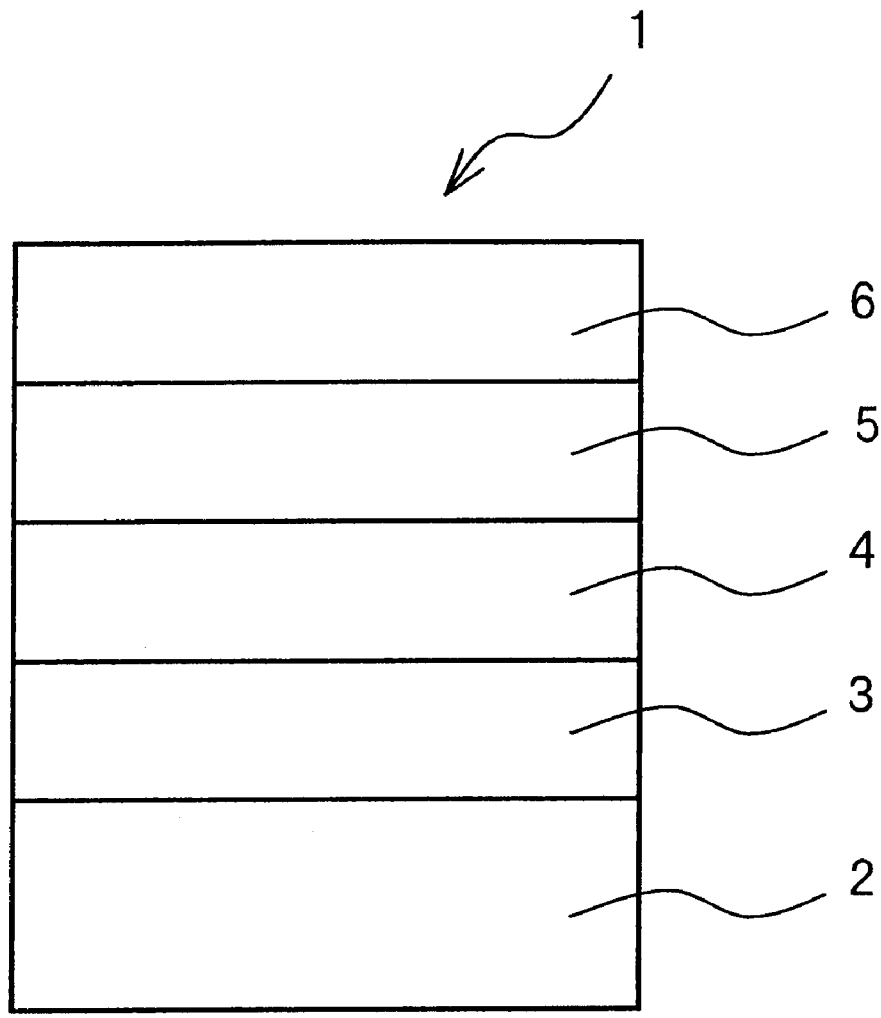
FIG. 1 is a schematic sectional view showing a magnetic disk 1 according to the present invention comprising an underlayer 3, a magnetic layer 4, a protective layer 5 and a lubricating layer 6 successively formed on a crystallized glass substrate 2.

The compositions of crystallized glasses of the present invention can be represented on the basis of oxides totally contained in crystalline phases and other glass matrix moieties in accordance with the compositions of crude glasses as defined above for the following reasons.

$SiO_2$ is a glass network former and also a component of major precipitated crystals, i.e. α-quartz solid solution or quartz-based crystals and enstatite. If the content of $SiO_2$ is less than 42%, α-quartz solid solution crystals or quartz-based crystals are hardly precipitated to fail to obtain a crystallized glass having high-expansion properties. If the content of $SiO_2$ is less than 42%, the residual glass matrix phases tend to lower the chemical durability and heat resistance. If the content of $SiO_2$ exceeds 65%, Young's modulus of the glass may rapidly decrease. Considering the species and amount of precipitated crystals, chemical durability, heat resistance, moldability and productivity, the content of $SiO_2$ is suitably42–65 %, preferably 44–60%, more preferably 46–58%.

MgO is a very important component generating enstatite crystals with $SiO_2$ component by heat treatment of a crude glass to improve strength and heat resistance while maintaining high Young's modulus. However, these effects cannot be obtained if the content of MgO is less than 15%. Thus, the content should be 15% or more. If the content of MgO exceeds 33%, α-quartz solid solution crystal or quartz-based crystals having high expansion properties are hardly precipitated from the glass to fail to obtain high expansion properties. Thus, MgO should be incorporated at or less than 33%. Considering the productivity, chemical durability, high-temperature viscosity and the species of precipitated crystals of glass, the content of MgO is suitably 15–33%, preferably 17–32%, more preferably 19–31%.

$Al_2O_3$ is an intermediate oxide of glass and a component of a major crystal species, i.e. α-quartz solid solution or quartz-based crystals. Incorporation of $Al_2O_3$ promotes precipitation of α-quartz solid solution crystal or quartz-based crystals to contribute to the improvement of the glass surface hardness. If the content of $Al_2O_3$ is less than 11%, α-quartz solid solution or quartz-based crystals having high expansion properties are hardly precipitated and Young's modulus of the resulting crystallized glass also tends to be low. If the content of $Al_2O_3$ exceeds 25%, however, enstatite having high Young's modulus is hardly precipitated and other undesirable results occur such as increased high-temperature viscosity or lowered high-temperature solubility. Therefore, the content of $Al_2O_3$ is suitably 11–25%, preferably 12–22%, more preferably 14–20%; considering the solubility, high-temperature viscosity, species of precipitated crystals of glass.

In crystallized glass substrates, the sum of $SiO_2$ and $Al_2O_3$ ($SiO_2+Al_2O_3$) is preferably 58 mol % or more and 80 mol % or less. If ($SiO_2+Al_2O_3$) is less than 58 mol %, α-quartz solid solution or quartz-based crystals are hardly precipitated. If ($SiO_2+Al_2O_3$) exceeds 80 mol %, Young's modulus tends to decrease. ($SiO_2+Al_2O_3$) is preferably 60 mol % or more, more preferably 62 mol % or more. ($SiO_2+Al_2O_3$) is preferably 75 mol % or less, more preferably 73% or less.

In crystallized glass substrates, the molar ratio between MgO and ($SiO_2+Al_2O_3$), i.e. $MgO/(SiO_2+Al_2O_3)$ is preferably 0.125 or more and 0.55 or less. If the molar ratio $MgO/(SiO_2+Al_2O_3)$ is less than 0.125, Young's modulus tends to decrease. The molar ratio $MgO/(SiO_2+Al_2O_3)$ exceeds 0.55, expansion coefficient tends to decrease. The molar ratio $MgO/(SiO_2+Al_2O_3)$ is preferably 0.2 or more, more preferably 0.3 or more. The molar ratio $MgO/(SiO_2+Al_2O_3)$ is preferably 0.5 or less, more preferably 0.4 or less.

In order to precipitate α-quartz solid solution or quartz-based crystals, the molar ratio between $SiO_2$ and $Al_2O_3$, i.e. $SiO_2/Al_2O_3$ is preferably 2.3 or more, more preferably more than 3.2, more preferably 3.25 or more. For similar reasons, the molar ratio $SiO_2/Al_2O_3$ is preferably 4.2 or less, more preferably 4.0 or less.

$TiO_2$ is not only an essential component as a crystal nucleating agent for the precipitation of crystal grains such as α-quartz solid solution or quartz-based crystals and enstatite but also an important component ensuring thermal stability of glass when the content of $SiO_2$ is low. If the content of $TiO_2$ is less than 5.5%, the role as a nucleating agent for major crystals cannot be achieved and surface crystallization occurs in the glass to hinder the preparation of a homogeneous crystallized glass. If the content of $TiO_2$ exceeds 13%, however, α-quartz solid solution or quartz-based crystals having high expansion properties are hardly precipitated and the high-temperature viscosity of the glass becomes excessively low to invite phase separation or transparency loss, whereby the productivity of the glass is extremely lowered. Therefore, the convent of $TiO_2$ is suitably 5.5–13%, preferably 6.5–12%, more preferably 6.5–9.5%, considering the productivity, high-temperature viscosity and crystal nucleation of glass.

Crystallized glasses of the present invention may further comprise $ZrO_2$ in addition to the above-mentioned components. $ZrO_2$ is added to control the high-temperature viscosity or stability of glass. A minor amount of $ZrO_2$ may be added to improve thermal stability of glass or enhance the high-temperature viscosity of the melt, thus facilitate the preparation of glass. If the content of $ZrO_2$ exceeds 4%, however, the high-temperature solubility of the glass is lowered or the precipitation of major crystals is inhibited. Thus, the amount of $ZrO_2$ is suitably 4% or less, preferably 3% or less, more preferably 2% or less.

Crystallized glasses of the present invention may further comprise $Y_2O_3$ in addition to said components. When about 1% of $Y_2O_3$ is added to crystallized glasses of the present invention, the Young's modulus of the crystallized glasses increases by about 5 GPa and the liquid phase temperature decreases by about 50° C. Incorporation of $Y_2O_3$ also improves thermal stability of the glass and contributes to the precipitation of α-quartz solid solution or quartz-based crystals. However, excessive $Y_2O_3$ may invite surface crystallization in the glass during heat treatment to fail to prepare an intended crystallized glass, because $Y_2O_3$ is capable of suppressing the nucleation of said titanates. Thus, the content of $Y_2O_3$ is preferably in the rage of 0.1–5%. Particularly, the content of $Y_2O_3$ is more preferably in the range of 0.2–4%, even more preferably 0.2–2%.

Crystallized glasses of the present invention may further comprise up to 5% of rare earth metal oxide components such as $Li_2O$, $Na_2O$, $K_2O$, CaO, SrO, BaO, $Fe_2O_3$, $Ga_2O_3$, $B_2O_3$, $P_2O_5$, $Nb_2O_5$, $Ta_2O_5$ and $La_2O_3$ without affecting desired properties. However, these components should desirably be limited to 5% or less because they may considerably lower the Young's modulus of glass or inhibit the precipitation of major crystals. Further considering the productivity of glass, the content is preferably 4% or less, more preferably 0–2%. ZnO is a component facilitating the precipitation of spinel in place of α-quartz solid solution or quartz-based crystals and enstatite. Therefore, crystallized glasses of the present invention are preferably free from ZnO, though they may contain ZnO.

$As_2O_3$ and $Sb_2O_3$ are components added as defoamers for homogenization of crude glass. When appropriate amounts of $As_2O_3$ or $Sb_2O_3$ or $As_2O_3+Sb_2O_3$ are added to a glass depending on the high-temperature viscosity of the glass, a more homogeneous glass can be obtained. However, excessive amounts of these defoamers tend to increase the specific gravity of the glass to lower the Young's modulus and may react with the platinum crucible for melting to damage the crucible. Thus, the content of $As_2O_3+Sb_2O_3$ is preferably 2% or less. Particularly, the content of $As_2O_3+Sb_2O_3$ is preferably 1.5% or less.

Crystallized glasses of the present invention (crystallized glass substrates (1), (7), (8)) comprise enstatite (including enstatite solid solution) crystal of the composition $MgO·SiO_2$ and $(Mg·Al)SiO_3$, for example, or α-quartz solid solution or quartz-based crystals as major crystals. They may contain only enstatite solid solution, but not enstatite. Enstatite includes clinoenstatite, protoenstatite and enstatite. The α-quartz solid solution can be selected from $2MgO·2Al_2O_3·5SiO_2$, $MgO·Al_2O_3·3SiO_2$ and $MgO·Al_2O_3·3SiO_2$, for example.

As used herein, major crystals refer to crystals essential for obtaining the effects of the present invention and predominant over other crystals in a glass. According to the present invention, either α-quartz solid solution or enstatite (including enstatite solid solution) is the most abundantly precipitated crystal species and the other is the second most abundantly precipitated crystal species. In crystallized glasses of the present invention, the total of major crystals α-quartz solid solution and enstatite (including enstatite solid solution) is 50% by volume or more.

A crystallized glass of the present invention (crystallized glass substrate (2)) comprises a total of 50% by volume or more of enstatite (including enstatite solid solution) of the composition MgO.SiO$_2$ and (Mg.Al)SiO$_3$, for example, and α-quartz solid solution in the crystals.

Crystallized glasses of the present invention (crystallized glass substrates (3)–(6) comprise quartz-based crystals having a diffraction pattern almost comparable to that unique to quartz in the X-ray diffraction pattern and enstatite and/or enstatite solid solution as crystalline phases. These crystallized glasses may also have a specific gravity is 2.9 g/cm$^3$ or more. Crystallized glass substrates (3) and (5) comprise quartz-based crystals and enstatite and/or enstatite solid solution as major crystalline phases. The major crystalline phase here refers to a crystalline phase essential for obtaining the effects of the present invention and predominant in a glass over other crystalline phases (the species of which can be defined by X-ray diffraction). Crystallized glass substrates (4) and (6) comprise 50% by volume or more of quartz-based crystals and enstatite and/or enstatite solid solution.

Crystallized glasses of the present invention (crystallized glass substrates (3)–(6)) have a specific gravity of 2.9 g/cm$^3$ or more. Quartz-based crystals having a diffraction pattern almost comparable to that unique to quartz in the X-ray diffraction pattern are thought to mostly maintain the crystal system of quartz but further comprise other oxide molecules in solution, so that a diffraction pattern almost comparable to that unique to quartz is observed in the X-ray diffraction pattern. Thus, crystallized glasses containing quartz-based crystals have a specific gravity of 2.9 g/cm$^3$ or more, which is higher than that of crystallized glasses containing quartz crystals. The upper limit of the specific gravity of crystallized glasses of the present invention (crystallized glass substrates (3)–(6)) is about 3.5 g/cm$^3$. Crystallized glasses of the present invention have a gravity of approximately 3.0–3.2 g/cm$^3$ as also shown in the examples below.

In addition to said major crystalline phases, minor amounts of other crystals such as spinel, mullite, forsterite, cordierite, titanates may also be contained. Titanates can act as a crystal nucleus for enstatite and α-quartz solid solution or quartz-based crystals.

Crystallized glasses of the present invention may comprise, for example, about 40% by volume of α-quartz solid solution or quartz-based crystals, about 25–30% by volume of enstatite (including enstatite solid solution) and about 10–15% by volume of a titanate.

In crystallized glasses of the present invention, the proportion of crystals in the glasses is preferably about 20% or more. If the proportion of crystals in glasses exceeds 80%, however, the grain size of crystals unpreferably tends to increase. The proportion of crystals in glasses preferably 40–80%, particularly 45–80%.

The mean grain size of crystals (enstatite and its solid solution and/or α-quartz solid solution or quartz-based crystals) contained in crystallized glasses of the present invention is preferably in the range of 10–1000 nm, more preferably 10–700 nm. If the mean crystal size is 1000 nm (1 μm) or less, mechanical strength of the glass cannot be lowered and surface roughness of the glass cannot be damaged by separation of crystals during polishing.

The process for preparing crystallized glasses of the present invention is not specifically limited, but may be any of various glass production processes. For example, the high-temperature melting process is applied, i.e. a glass material having a predetermined composition is molten in the air or an inert gas atmosphere and homogenized by bubbling or addition of a defoamer or stirring, then formed into a plate glass by a well-known press process, float process or downdraw process, followed by cutting, polishing or other machining to form a glass having a desired size and shape. The heat treatment method of the molding is not specifically limited, but can be selected depending on the content of crystallization promoters, the transition temperature or crystallization peak temperature of the glass, etc. For obtaining microcrystals, for example, it is preferable to initially generate a lot of crystal nuclei by a heat treatment at a relatively low temperature and then raise the temperature for crystal growth. According to the present invention, crystallized glasses containing enstatite and/or α-quartz solid solution or quartz-based crystals having a grain size of 10–1000 nm can be obtained by controlling heat treatment conditions.

The present invention also involves such heat treatment conditions that enstatite and/or enstatite solid solution and α-quartz solid solution or quartz-based crystals are precipitated as major crystalline phases or in the amount of 50% by weight or more by heat treatment. The conditions are selected to precipitate said major crystalline phases though other crystals such as spinel, mullite, forsterite, cordierite, titanates may also be precipitated. Such conditions can be appropriately selected from nucleation heat treatment (primary heat treatment) at 760–840° C. for 1–8 hours followed by crystallization treatment (secondary heat treatment) at 950–1150° C. for 1–6 hours, depending on the composition of the glass. Particularly, nucleation heat treatment conditions seem to influence the resulting major crystalline phases. If the nucleation heat treatment (primary heat treatment) temperature is too low, α-quartz solid solution (or quartz-based crystals) is hardly obtained during crystallization treatment (secondary heat treatment). Conditions for nucleation heat treatment (primary heat treatment) preferably include a temperature range of 800–840° C., more preferably 810–830° C. Conditions for crystallization treatment (secondary heat treatment) preferably include a temperature range of 1010–1150° C., more preferably 1010–1140° C., even more preferably 1030–1120° C. If the temperature of crystallization treatment (secondary heat treatment) is low, phase transition from β-quartz solid solution into α-quartz solid solution may hardly occur, which makes it difficult to obtain a desired crystalline phase.

The method for polishing a molded article after the heat treatment is not specifically limited, but may be a known method using synthetic abrasive grains such as synthetic diamond, silicon carbide, aluminum oxide, boron carbide or natural abrasive grains such as natural diamond, cerium oxide. For example, the surface roughness (Ra) can be controlled in the range of 0.1–1.0 nm by lapping with ordinary abrasion method and apparatus and polishing with cerium oxide.

Crystallized glasses of the present invention can be used as substrates for magnetic disks to satisfy all of the requirements for substrates for magnetic disks such as surface smoothness, flatness, strength, hardness, and chemical durability, heat resistance. They have a high Young's modulus about 1.5 times or more higher than that of conventional aluminum substrates to further reduce deflection due to high-speed rotation of disks, so that they are well suitable as substrate materials for achieving high-TPI hard disks. The grain size and amount of precipitated crystals contained in crystallized glasses of the present invention can be controlled by sequentially changing the schedule of heat treatment or the glass composition. Characteristics of the crystallized glasses can be widely controlled by changing the grain size or amount of precipitated crystals contained in the crystallized glasses.

[Explanation of Magnetic Disk]

Data recording media according to the present invention comprises a substrate of the present invention and a recording layer formed on said substrate. A magnetic disk (hard disk) comprising at least a magnetic layer formed on a main surface of a substrate made of the glass of the present invention is described below.

In addition to the magnetic layer, other functional layers such as underlayer, protective layer, lubricating layer may be optionally formed. These layers can be formed by various thin film-forming techniques. Materials for the magnetic layer are not particularly limited. For example, the magnetic layer may be based on Co, ferrite, iron-rare earthmetal, etc. The magnetic layer may be either horizontal or vertical magnetic recording layer.

Specific examples of the magnetic thin layer are magnetic thin films based on Co, such as CoPt, CoCr, CoNi, CoNiCr, CoCrTa, CoPtCr, CoNiCrPt, CoNiCrTa, CoCrPtTa, CoCrPt-SiO. The magnetic layer maybe divided by a non-magnetic layer to form a multilayer structure for noise reduction.

The underlayer of the magnetic layer may be selected depending on the magnetic layer. For example, the underlayer may consist of at least one material selected from non-magnetic metals such as Cr, Mo, Ta, Ti, W, V, B, Al, or oxides, nitride, carbides and the like of those metals. If the magnetic layer is based on Co, the underlayer preferably consists of element Cr or a Cr alloy from the viewpoint of improving magnetic characteristics. The underlayer is not limited to a single layer, but may be a multilayer structure consisting of identical or different layers such as Al/Cr/CrMo, Al/Cr/Cr.

The protective layer may be, for example, a Cr film, Cr alloy film, carbon film, zirconia film, silica film or the like. These protective layers as well as the underlayer, magnetic layer and the like can be continuously formed in an inline sputtering apparatus or the like. These protective layers may be a single layer or multilayer structure comprising identical or different layers.

Another protective layer may be formed on or instead of the former protective layer. For example, a silicon oxide ($SiO_2$) layer may be formed on the former protective layer by applying a dispersion of colloidal silica micrograms in tetraalkoxysilane diluted in an alcoholic solvent and sintering it.

While various kinds of layers have been proposed as the lubricating layer, it is generally formed by applying a liquid lubricant perfluoropolyether diluted in a solvent such as freons by dipping, spin coating, spraying or the like and subjecting the coated layer to a heat treatment as required.

Crystallized glass substrates of the present invention can be easily molded and have a high Young modulus of 110 GPa or more, a high thermal expansion coefficient of $90 \times 10^{-7}/°$ C. or more (at 30–300° C.) and excellent surface smoothness (surface roughness Ra<1.0 nm). Crystallized glasses may have whatever high thermal expansion efficient (at 30–300° C.) for use as substrates for magnetic disks, but actually at most about $150 \times 10^{-7}/°$ C., and about $130 \times 10^{-7}/°$ C. or less for most compositions.

When crystallized glass substrates of the present invention are used in a magnetic disk, the following advantages are obtained. Necessary heat treatments for improving properties of the magnetic film can be applied without deforming the substrate because said materials have high heat resistance. The flying height of the magnetic head can be reduced or high-density recording can be attained because of excellent flatness. Moreover, the magnetic disk can be made thinner and rotated at higher speed without failure because of high Young's modulus or specific modulus and strength. In addition, they can be relatively stably obtained as material glasses and can easily be produced on an industrial basis, so that they can be sufficiently expected as inexpensive glass substrates for the next generation magnetic recording media.

The following examples further illustrate the present invention, without limiting the same thereto.

EXAMPLES

Tables 1 and 2 show the compositions of glasses of the examples in mol %. For preparing glass melts of these compositions, 250–300 g of starting materials such as $SiO_2$, $Al_2O_3$, $Al(OH)_3$, $MgO$, $Y_2O_3$, $TiO_2$, $ZrO_2$ in the proportions shown in Tables 1 and 2 were weighed out and thoroughly mixed to prepare formulated batches, which were placed in a platinum crucible and molten at 1550° C. for 4–5 hours with stirring in the air. After each batch was molten, the glass melt was cast into a carbon mold and left to cool down to the glass transition temperature, and immediately introduced into an annealing furnace, where the melt was annealed for about 1 hour at the glass transition temperature and left to cool down to room temperature in the furnace. Any crystals that could be microscopically observed were not precipitated from the resulting glass.

The resulting glass was polished into 100×20×10 mm and then introduced into a heat treatment furnace, where it was heated at a heating rate of 3–10° C./min to the primary heat treatment temperature shown in Tables 1 and 2 and maintained at said temperature for about 2–15 hours so that it underwent primary heat treatment (nucleation heat treatment step). Immediately after the primary heat treatment was completed, the glass was heated at a heating rate of 3–10° C./min from the primary heat treatment temperature to the secondary heat treatment temperature shown in Tables 1 and 2 and maintained at said temperature for about 1–5 hours (crystallization treatment step), and then cooled to room temperature in the furnace to prepare a crystallized glass. The resulting crystallized glass was polished into the length of 95 mm to prepare a sample for the determination of Young's modulus and specific gravity. The sample for the determination of Young's modulus was further cut and precisely polished into a size of 30×1×20 mm to prepare a sample for the analysis of surface roughness. Young's modulus was ultrasonically determined on samples of 95×10×10 mm. Thermal expansion coefficient (at 30–300° C.) was determined on samples of φ5×L 20 mm. The test data are shown in Tables 1 and 2 along with the glass compositions.

TABLE 1

Compositions and properties of crystallized glasses of examples (mol %)

|  | 1 | 2 | 3 | 4 | 5 | 6 | 7 | 8 |
|---|---|---|---|---|---|---|---|---|
| $SiO_2$ | 55.00 | 48.00 | 55.00 | 55.00 | 52.00 | 53.00 | 54.00 | 46.00 |
| $Al_2O_3$ | 14.50 | 20.00 | 14.50 | 13.50 | 16.00 | 14.00 | 13.50 | 14.00 |
| MgO | 22.50 | 22.50 | 22.50 | 22.50 | 23.00 | 23.00 | 23.00 | 30.50 |
| $Y_2O_3$ |  |  |  | 1.00 | 0.50 | 1.00 | 1.00 | 1.00 |
| $TiO_2$ | 8.00 | 9.50 | 6.50 | 8.00 | 8.50 | 9.00 | 8.50 | 8.50 |

TABLE 1-continued

Compositions and properties of crystallized glasses of examples (mol %)

|  |  |  |  |  |  |  |  |  |
|---|---|---|---|---|---|---|---|---|
| ZrO$_2$ |  |  | 1.50 |  |  |  |  |  |
| Heating rate (° C./min) | 5 | 5 | 5 | 5 | 5 | 5 | 5 | 5 |
| Primary heat treatment temperature (° C.) | 820 | 820 | 820 | 820 | 820 | 820 | 820 | 820 |
| Primary heat treatment period (h) | 2 | 2 | 2 | 2 | 2 | 2 | 2 | 2 |
| Heating rate (° C./min) | 5 | 5 | 5 | 5 | 5 | 5 | 5 | 5 |
| Secondary heat treatment temperature (° C.) | 1100 | 1100 | 1100 | 1050 | 1050 | 1050 | 1050 | 1100 |
| Secondary heat treatment period (h) | 4 | 4 | 4 | 4 | 4 | 4 | 4 | 4 |
| Young's modulus (GPa) | 133.8 | 141.7 | 140.1 | 135.5 | 139.5 | 138.5 | 137.7 | 165.2 |
| Thermal expansion coefficient 10$^{-7}$/° C. | 110.57 | 103.5 | 114.54 | 106.8 | 98.07 | 98.3 | 109 | 92.5 |
| Surface smoothness Ra (nm) | 0.3 | 0.5 | 0.5 | 0.4 | 0.3 | 0.27 | 0.3 | 0.5 |
| Mean grain size (nm) | <0.1 | <0.2 | <0.1 | <0.1 | <0.1 | <0.1 | <0.1 | <0.2 |
| MgO/(SiO$_2$ + Al$_2$O$_3$) (molar ratio) | 0.32 | 0.33 | 0.32 | 0.32 | 0.34 | 0.34 | 0.34 | 0.51 |
| SiO$_2$ + Al$_2$O$_3$ | 69.5 | 68 | 69.5 | 68.5 | 68 | 67 | 67.5 | 60 |
| SiO$_2$/Al$_2$O$_3$ | 3.79 | 2.40 | 3.79 | 4.07 | 3.27 | 3.79 | 4.00 | 3.29 |
| Specific gravity (g/cm$^3$) | 2.988 | 3.038 | 3.067 | 3.043 | 2.998 | 3.072 | 3.067 | 3.198 |

|  | 9 | 10 | 11 | 12 | 13 |
|---|---|---|---|---|---|
| SiO$_2$ | 50.00 | 58.00 | 46.00 | 48.00 | 50.00 |
| Al$_2$O$_3$ | 14.00 | 14.00 | 14.00 | 14.00 | 14.00 |
| MgO | 26.50 | 18.50 | 30.00 | 28.00 | 26.00 |
| Y$_2$O$_3$ | 1.00 | 1.00 | 1.00 | 1.00 | 1.00 |
| TiO$_2$ | 8.50 | 8.50 | 9.00 | 9.00 | 9.00 |
| ZrO$_2$ |  |  |  |  |  |
| Heating rate (° C./min) | 5 | 5 | 5 | 5 | 5 |
| Primary heat treatment temperature (° C.) | 820 | 820 | 820 | 820 | 820 |
| Primary heat treatment period (h) | 2 | 2 | 2 | 2 | 2 |
| Heating rate (° C./min) | 5 | 5 | 5 | 5 | 5 |
| Secondary heat treatment temperature (° C.) | 1050 | 1100 | 1100 | 1050 | 1050 |
| Secondary heat treatment period (h) | 4 | 4 | 4 | 4 | 4 |
| Young's modulus (GPa) | 150.2 | 135.7 | 165.4 | 155.6 | 146.4 |
| Thermal expansion coefficient 10$^{-7}$/° C. | 91.6 | 115.1 | 99.33 | 95.3 | 108.2 |
| Surface smoothness Ra (nm) | 0.3 | 0.55 | 0.72 | 0.42 | 0.35 |
| Mean grain size (nm) | <0.1 | <0.1 | <0.2 | <0.1 | <0.1 |
| MgO/(SiO$_2$ + Al$_2$O$_3$) (molar ratio) | 0.41 | 0.26 | 0.5 | 0.45 | 0.41 |
| SiO$_2$ + Al$_2$O$_3$ | 64 | 72 | 60 | 62 | 64 |
| SiO$_2$/Al$_2$O$_3$ | 3.57 | 4.14 | 3.29 | 3.36 | 3.57 |
| Specific gravity (g/cm$^3$) | 3.130 | 3.038 | 3.202 | 3.167 | 3.120 |

TABLE 2

Compositions and properties of crystallized glasses of examples (mol %)

|  | 14 | 15 | 16 | 17 | 18 | 19 | 20 | 21 | 22 | 23 |
|---|---|---|---|---|---|---|---|---|---|---|
| SiO$_2$ | 54.00 | 46.00 | 48.00 | 50.00 | 52.00 | 51.00 | 51.00 | 51.00 | 51.00 | 51.00 |
| Al$_2$O$_3$ | 14.00 | 19.50 | 17.50 | 15.50 | 13.50 | 20.00 | 18.00 | 16.00 | 15.00 | 13.50 |
| MgO | 22.00 | 24.50 | 24.50 | 24.50 | 24.50 | 19.00 | 21.00 | 23.00 | 24.00 | 25.50 |
| Y$_2$O$_3$ | 1.00 | 1.00 | 1.00 | 1.00 | 1.00 | 1.00 | 1.00 | 1.00 | 1.00 | 1.00 |
| TiO$_2$ | 9.00 | 9.00 | 9.00 | 9.00 | 9.00 | 9.00 | 9.00 | 9.00 | 9.00 | 9.00 |
| ZrO$_2$ |  |  |  |  |  |  |  |  |  |  |
| Heating rate (° C./min) | 5 | 5 | 5 | 5 | 5 | 5 | 5 | 5 | 5 | 5 |
| Primary heat treatment temperature (° C.) | 820 | 820 | 820 | 820 | 820 | 820 | 820 | 820 | 820 | 820 |
| Primary heat treatment period (h) | 2 | 2 | 2 | 2 | 2 | 2 | 2 | 2 | 2 | 2 |
| Heating rate (° C./min) | 5 | 5 | 5 | 5 | 5 | 5 | 5 | 5 | 5 | 5 |
| Secondary heat treatment temperature (° C.) | 1050 | 1100 | 1050 | 1050 | 1050 | 1100 | 1050 | 1050 | 1050 | 1050 |
| Secondary heat treatment period (h) | 4 | 4 | 4 | 4 | 4 | 4 | 4 | 4 | 4 | 4 |
| Young's modulus (GPa) | 134.5 | 156.1 | 149.2 | 145.9 | 140.4 | 146.8 | 139.7 | 141.8 | 143.6 | 144.3 |

TABLE 2-continued

Compositions and properties of crystallized glasses of examples (mol %)

|  | 14 | 15 | 16 | 17 | 18 | 19 | 20 | 21 | 22 | 23 |
|---|---|---|---|---|---|---|---|---|---|---|
| Thermal expansion coefficient $10^{-7}/°$ C.) | 106.4 | 103.4 | 101.4 | 108.8 | 101 | 103 | 105 | 107 | 110 | 109 |
| Surface smoothness Ra (nm) | 0.31 | 0.95 | 0.86 | 0.51 | 0.39 | 0.5 | 0.6 | 0.67 | 0.45 | 0.3 |
| Mean grain size (nm) | <.1 | <0.5 | <0.3 | <0.1 | <0.1 | <0.2 | <0.2 | <0.15 | <0.1 | <0.1 |
| MgO/(SiO$_2$ + Al$_2$O$_3$) (molar ratio) | 0.32 | 0.37 | 0.37 | 0.37 | 0.37 | 0.26 | 0.30 | 0.34 | 0.36 | 0.40 |
| SiO$_2$ + Al$_2$O$_3$ | 68 | 65 | 65.5 | 65.5 | 65.5 | 71 | 69 | 67 | 66 | 64.5 |
| SiO$_2$/Al$_2$O$_3$ | 3.86 | 2.36 | 2.74 | 3.23 | 3.85 | 2.55 | 2.83 | 3.19 | 3.40 | 3.78 |
| Specific gravity (g/cm$^3$) | 3.056 | 3.099 | 3.125 | 3.112 | 3.084 | 3.063 | 3.049 | 3.092 | 3.105 | 3.108 |

(1) Identification of Crystal Species

Crystallized glass powder was analyzed for X-ray diffraction using Cu Kα-rays. (Instrument: X-ray diffractometer MXP18A made by MAC Science Co., Ltd., tube voltage 50 kV, tube current 300 mA, scanning angle: 10–90°). Precipitated crystals were identified from the peaks of the resulting X-ray diffraction.

(2) Determination Method of Physical Properties

Determination of Specific Gravity (Density)

Glass samples were used as such as samples for the determination of specific gravity. The instrument used was an electronic densimeter based on Archimedes' principle (MD-200S made by Mirage Trading Co., Ltd.). The measurement precision of specific gravity at room temperature is ±0.001 g/cm$^3$.

Determination of Young's Modulus

Rectangular samples having an end surface area of 10 mm square to 20 mm square and a length of 50–100 mm were tested for Young's modulus using the specific gravity (density) and sample length preliminarily measured with a vernier caliper as test conditions. The instrument used was UVM-2 made by Ultra Sonic Engineering. Longitudinal waves (TI1, TI2) and transverse waves (TS1, TS2) were measured by covering the probe and sample end faces with water for longitudinal waves and Sonicoat SHN20 or SHN-B25 for transverse waves. Measurement was repeated on each sample twice or more for longitudinal waves and five times or more for transverse waves to calculate the averages. Poisson's ratio can also be obtained by this procedure. The measurement precision is ±1 GPa for Young's modulus and ±0.001 for Poisson's ratio.

Thermal Mechanical Analysis

Specimens were cut out from crystallized glass samples and ground into a cylinder of φ5 mm×20 mm, which was used as a TMA sample. The instrument used was TAS100 made by Rigaku Corporation. Test conditions were a heating rate of 4 K/min and a maximum temperature of 350° C.

Atomic Force Microscopy

Crystallized glass samples were machined into 30×25×1 mm and two planes of 30×15 mm were microoptically polished to prepare AMF samples. The instrument used was Nano Scope III made by Digital Instrument. Test conditions were as follows: Tapping mode AFM, analysis area 2×2 μm or 5×5 μm, sample number256×256, scan rate 1 Hz, and data processing conditions: Planefit Auto order 3 (X, Y), Flatten Auto order 3. The integral gain, proportion gain and set point were adjusted at each analysis. As a pretreatment for analysis, polished samples were washed with pure water, IPA or the like in a large washing machine in a clean room.

Crystallization Degree

Crystallization degreex(%) can be calculated by the equations below from the results of total scattering intensity of X-ray measured on crystallized glass samples. The X-ray diffractometer used was X-ray diffractometer MXP18A made by MAC Science Co., Ltd.

$x=(1-(\Sigma Ia100))\times 100$ $x=(\Sigma Ic/\Sigma Ic100)\times 100$

Ia: Scattering intensity of amorphous moieties of an unknown material

Ic: Scattering intensity of crystalline moieties of an unknown material

Ia100: Scattering intentisy of a 100% amorphous sample

Ic100: Scattering intensity of a 100% crystalline sample.

Determination of Thermal Expansion Coefficient

Glass samples were cut out and ground into a cylinder of φ50 nm×20 nm, which was used as a TMA sample. The instrument used was TAS100 made by Rigaku Corporation. Thermal expansion coefficient at 100–300° C. was determined under test conditions involving a heating rate of 4 K/min and a maximum temperature of 350° C.

Surface roughness was determined by observing the surface sith an atomic force microscope (AFM). Arithmetic average roughness was calculated within a vision of 5×5 μm in 5 areas on the surface of each sample. The mean grain size of crystal grains was determined under a transmission electron microscope or scanning electron microscope (SEM). Surface roughness depends on the polishing conditions or heat treatment conditions, but some examples according to the present invention show a low surface roughness of about 3 angstroms, which can sufficiently satisfy the requirements of surface smoothness for the next generation magnetic disks. If heat treatment conditions or polishing conditions are optimized, crystallized glass having more excellent surface smoothness can be prepared. The results of X-ray diffraction showed that major crystalline phases or crystals contained at 50% by volume or more in crystallized glasses obtained in all the examples are α-quartz solid solution or quartz-based crystals and enstatite (including its solid solution).

For comparison, compositions and properties of a crystallized glass substrate commercially available under TS-10 and disclosed in U.S. Pat. No. 5,391,522 and a glass substrate disclosed in U.S. Pat. No. 5,476,821 are described as Comparative examples 1 and 2, respectively, in Table 3.

TABLE 3

| Comparative example | 1<br>Commercially available crystallized glass TS-10 | 2<br>High-Young's modulus crystallized glass |
|---|---|---|
| Patent Number | USP No. 2516533 | USP No. 5476821 Example 3 |
| SiO$_2$ |  | 46.9 wt % |

TABLE 3-continued

| Comparative example | 1<br>Commercially<br>available<br>crystallized<br>glass TS-10 | 2<br>High-Young's<br>modulus<br>crystallized<br>glass |
|---|---|---|
| $Al_2O_3$ | | 24.8 wt % |
| MgO | | 15.0 wt % |
| ZnO | | 1.8 wt % |
| $Li_2O$ | | |
| $TiO_2$ | | 11.5 wt % |
| Young's modulu (GPa) | 90–100 | 129.2 |
| Surface roughness Ra (nm) | 1.0–3.5 | 0.53 |
| Thermal expansion coefficient ($10^{-7}$/° C.) | 70–80 | 60 |

As shown in Tables 1 and 2, glass substrates of the examples according to the present invention have a high Young's modulus (110–200 GPa) so that they scarcely warp or deflect even during high-speed rotation when they are used as substrates for magnetic recording media, suggesting that they can satisfy the demand for even thinner substrates. These crystallized glasses also have a high thermal expansion coefficient of $90 \times 10^{-7}$/° C. at 30–300° C., which improves adaptability to stainless components of hard disks to facilitate precise design required for high-density recording.

In contrast, the crystallized glass substrate of Comparative example 1 is poor in surface smoothness and much inferior to glass substrates of the present invention in strength properties such as heat resistance and Young's modulus. The crystallized glass substrate of Comparative example 2 is inferior to glasses of the present invention in thermal expansion coefficient (at 30–300° C.) and Young's modulus.

This proves that high-Young's modulus crystallized glasses of the present invention are very useful for use as substrates for magnetic recording media because the above-mentioned physical, thermal or mechanical properties should be excellent for this purpose.

[Process for Preparing a Magnetic Disk]

As shown in FIG. 1, a magnetic disk 1 of the present invention comprises a underlayer 3, magnetic layer 4, protective layer 5 and lubricating layer 6 successively formed on a substrate 2 of the crystallized glass of the above Example 1.

Specifically, substrate 2 is in the form of a disk having an outer radius of 32.5 mm, inner radius of 10.0 mm and thickness of 0.43 mm, with both main surfaces being precision-polished at surface roughness Ra (JIS B0601) of 4 angstroms and Rmax of 40 angstroms.

The underlayer is a thin film of CrV in a ratio of Cr 83 at %: V 17 at % having a thickness of about 600 angstroms.

The magnetic layer is a thin film of CoPtCr in a ratio of Co 76 at %: Pt 6.6 at %: Cr 17.4 at % having a thickness of about 300 angstroms.

The protective layer is a carbon thin film having a thickness of about 100 angstroms.

The lubricating layer consists of perfluoropolyether applied on the carbon protective layer by spin coating into a thickness of 8 angstroms.

The preparation process of this magnetic disk is described below.

The crystallized glass of Example 1 is cut into a disk having an outer radius of 32.5 mm, inner radius of 10.0 mm and thickness of 0.5 mm and both main surfaces are precision-polished at surface roughness Ra (JIS B0601) of 4 angstroms and Rmax of 40 angstroms to give a glass substrate for magnetic recording media.

Then, a holder containing said glass substrate is continuously sent to a second chamber containing a CrV target (Cr 83 at %, V 17 at %) and a third chamber containing a CoPtCr target (Co 76 at %, Pt 6.6 at %, Cr 17.4 at %) in sequence to form films on the substrate by sputtering at a pressure of 2 mtorr and a substrate temperature of 350° C. in an Ar atmosphere, whereby a CrV underlayer having a thickness of about 600 angstroms and a CoPtCr magnetic layer having a thickness of about 300 angstroms are obtained.

Then, the laminate comprising the underlayer and magnetic layer is sent to a fourth chamber containing a heater for heat treatment. Heat treatment takes place in the fourth chamber under Ar gas (pressure 2 mtorr) atmosphere at varying heat treatment temperatures.

Said substrate is sent to a fifth chamber containing a carbon target to give a carbon protective layer having a thickness of about 100 angstroms under the same condition as used for the CrV underlayer CoPtCr magnetic layer except that sputtering is performed in an atmosphere of Ar+$H_2$ gas ($H_2$=6%). The resulting disk has a smooth film surface reflected by the smoothness of the substrate.

Finally, the substrate completed with the carbon protective layer was removed from said inline sputtering apparatus, and a lubricating layer having a thickness of 8 angstroms is formed by applying perfluoropolyether on the carbon protective layer by dipping to give a magnetic disk.

What is claimed is:

1. A crystallized glass substrate for data recording media comprising 42–65 mol % $SiO_2$, 11–25 mol % $Al_2O_3$, 15–33 mol % MgO and 5.5–13 mol % $TiO_2$, wherein major crystalline phases comprise α-quartz solid solution and enstatite and/or enstatite solid solution.

2. A crystallized glass substrate for data recording media comprising 42–65 mol % $SiO_2$, 11–25 mol % $Al_2O_3$, 15–33 mol % MgO and 5.5–13 mol % $TiO_2$ and comprising α-quartz solid solution and enstatite and/or enstatite solid solution wherein the total of the α-quartz solid solution, enstatite and enstatite solid solution is 50% by volume or more in the crystals.

3. The crystallized glass substrate according to claim 1, wherein $SiO_2$+$Al_2O_3$ is in the range of 58–80 mol %.

4. The crystallized glass substrate according to claim 2, wherein $SiO_2$+$Al_2O_3$ is in the range of 58–80 mol %.

5. The crystallized glass substrate according to claim 1, wherein MgO/($SiO_2$+$Al_2O_3$) is in the range of 0.125–0.55.

6. The crystallized glass substrate according to claim 2, wherein MgO/($SiO_2$+$Al_2O_3$) is in the range of 0.125 –0.55.

7. The crystallized glass substrate according to claim 1, which further comprises 0–4 mol % $ZrO_2$.

8. The crystallized glass substrate according to claim 2, which further comprises 0–4 mol % $ZrO_2$.

9. The crystallized glass substrate according to claim 1, which further comprises 0.1–5 mol % $Y_2O_3$.

10. The crystallized glass substrate according to claim 2, which further comprises 0.1–5 mol % $Y_2O_3$.

11. The crystallized glass substrate according to claim 1, wherein the Young's modulus is 110 GPa or more and the thermal expansion coefficient is $90 \times 10^{-7}$/° C. or more at 30–300° C.

12. The crystallized glass substrate according to claim 2, wherein the Young's modulus is 110 GPa or more and the thermal expansion coefficient is $90 \times 10^{-7}$/° C. or more at 30–300° C.

13. The crystallized glass substrate according to claim 1, wherein the grain size of said crystalline phases is in the range of 10–1000 nm.

14. The crystallized glass substrate according to claim 2, wherein the grain size of said crystalline phases is in the range of 10–1000 nm.

15. The crystallized glass substrate according to claim 1, which is free from ZnO.

16. The crystallized glass substrate according to claim 2, which is free from ZnO.

17. A crystallized glass substrate for data recording media comprising 42–65 mol % $SiO_2$, 11–25 mol % $Al_2O_3$, 15–33 mol % MgO, 5.5–13 mol % $TiO_2$ and 0.1–5 mol % $Y_2O_3$, wherein major crystalline phases comprise α-quartz solid solution and enstatite and/or enstatite solid solution.

18. A crystallized glass substrate for data recording media comprising 42–65 mol % $SiO_2$, 11–25 mol % $Al_2O_3$, 15–33 mol % MgO, 5.5–13 mol % $TiO_2$, 0.1–5 mol % $Y_2O_3$, and 0–4 mol % $ZrO_2$, wherein major crystalline phases comprise α-quartz solid solution and enstatite and/or enstatite solid solution.

19. The crystallized glass substrate according to claim 17, wherein $SiO_2+Al_2O_3$ is in the range of 58–80 mol %, the molar ratio $MgO/(SiO_2+Al_2O_3)$ is in the range of 0.125–0.55 and the molar ratio $SiO_2/Al_2O_3$ is in the range of 2.3–4.2.

20. The crystallized glass substrate according to claim 18, wherein $SiO_2+/Al_2O_3$ is in the range of 58–80 mol %, the molar ratio $MgO/(SiO_2+Al_2O_3)$ is in the range of 0.125–0.55 and the molar ratio $SiO_2/Al_2O_3$ is in the range of 2.3–4.2.

21. A crystallized glass substrate for data recording media obtained by a process comprising subjecting a glass comprising subjecting a glass comprising 42–65 mol % $SiO_2$, 11–25 mol % $Al_2O_3$, 15–33 mol % MgO and 5.5–13 mol % $TiO_2$, wherein major crystalline phases comprise α-quartz solid solution and enstatite and/or enstatite solid solution, with the molar ratio $MgO/(SiO_2+Al_2O_3)$ being in the range of 0.125–0.55 and the molar ratio $SiO_2/Al_2O_3$ being in the range of 2.3–4.2 to a nucleation heat treatment step and a crystallization treatment step to give a crystallized glass wherein the heat treatment temperature in said nucleation heat treatment step is in the range of 760–840° C., the heat treatment temperature in said crystallization treatment step is in the range of 950–1150° C. and the heat treatment temperatures in said nucleation heat treatment step and crystallization treatment step are selected in such a manner than the resulting crystallized glass has a thermal expansion coefficient of $90 \times 10^{-7}/°$ C. or more at 30–300° C.

22. The substrate according to claim 21, wherein the heat treatment temperature in said nucleation heat treatment step is in the range of 810–830° C.

23. The substrate according to claim 21, wherein the heat treatment temperature in said crystallization treatment step is in the range of 1010–1150° C.

24. The substrate according to any one of claim 21, wherein the molar ratio $SiO_2/Al_2O_3$ of said glass is 3.25 or more.

25. The substrate according to any one of claim 21, wherein the specific gravity of said crystallized glass is 2.9 g/cm³ or more.

26. The crystallized glass substrate according to claim 1, wherein the data recording medium is a magnetic disk.

27. The crystallized glass substrate according to claim 2, wherein the data recording medium is a magnetic disk.

28. A data recording medium comprising the substrate according to claim 1 and a recording layer formed on said substrate.

29. A data recording medium comprising the substrate according to claim 2 and a recording layer formed on said substrate.

30. A data recording medium comprising the substrate according to claim 21 and a recording layer formed on said substrate.

31. The data recording medium according to claim 28, wherein said recording layer is a magnetic recording layer.

32. The data recording medium according to claim 29, wherein said recording layer is a magnetic recording layer.

33. The data recording medium according to claim 30, wherein said recording layer is a magnetic recording layer.

\* \* \* \* \*